United States Patent
Hu et al.

(10) Patent No.: US 8,890,423 B2
(45) Date of Patent: Nov. 18, 2014

(54) BACKLIGHT DRIVING CIRCUIT, LCD DEVICE, AND METHOD FOR DRIVING BACKLIGHT DRIVING CIRCUIT

(71) Applicant: Shenzhen China Star Optoelectronics Technology Co., Ltd, Shenzhen (CN)

(72) Inventors: Anle Hu, Shenzhen (CN); Xianming Zhang, Shenzhen (CN)

(*) Notice: Subject to any disclaimer, the term of this patent is extended or adjusted under 35 U.S.C. 154(b) by 0 days.

(21) Appl. No.: 13/880,742

(22) PCT Filed: Apr. 7, 2013

(86) PCT No.: PCT/CN2013/073783
§ 371 (c)(1),
(2), (4) Date: Apr. 22, 2013

(87) PCT Pub. No.: WO2014/153793
PCT Pub. Date: Oct. 2, 2014

(65) Prior Publication Data
US 2014/0292200 A1  Oct. 2, 2014

(30) Foreign Application Priority Data
Mar. 29, 2013 (CN) .......................... 2013 1 0109280

(51) Int. Cl.
*H05B 41/36* (2006.01)
*G09G 3/36* (2006.01)
*H05B 33/08* (2006.01)

(52) U.S. Cl.
CPC ................................. *H05B 33/0887* (2013.01)
USPC ........... 315/186; 315/294; 315/297; 315/291; 345/102

(58) Field of Classification Search
USPC ............. 315/185 R, 186, 192, 250, 287, 291, 315/294, 297, 209 R; 327/543; 345/102
See application file for complete search history.

(56) References Cited

U.S. PATENT DOCUMENTS

| | | | |
|---|---|---|---|
| 8,558,481 B2* | 10/2013 | Kim et al. | 315/297 |
| 2006/0261754 A1* | 11/2006 | Lee | 315/291 |
| 2007/0001625 A1 | 1/2007 | Kim | |
| 2009/0009508 A1 | 1/2009 | Koo et al. | |
| 2010/0194301 A1 | 8/2010 | Okubo | |
| 2011/0227503 A1* | 9/2011 | Yuan et al. | 315/294 |
| 2012/0062148 A1* | 3/2012 | Kim et al. | 315/297 |
| 2012/0229036 A1 | 9/2012 | Takahashi et al. | |

FOREIGN PATENT DOCUMENTS

| | | |
|---|---|---|
| CN | 101533607 A | 9/2009 |
| CN | 201680231 U | 12/2010 |
| CN | 101944331 A | 1/2011 |
| CN | 102306484 A | 1/2012 |

(Continued)

OTHER PUBLICATIONS

Zhang Wei, the International Searching Authority written comments, Jan. 2014, CN.

*Primary Examiner* — Vibol Tan

(57) ABSTRACT

A backlight driving circuit includes a power module and a constant current driver chip. The power module includes a first controllable switch. An adjustable load is connected between the first controllable switch and a ground terminal of the backlight driving circuit, and the adjustable load includes a switching module controlling a resistance value of the adjustable load, a switching mode signal of the backlight driving circuit is sent to a control end of the switching module. A first end of the adjustable load that is connected to the first controllable switch is coupled to an over current protection (OCP) port of the constant current driver chip.

12 Claims, 5 Drawing Sheets

(56) References Cited

FOREIGN PATENT DOCUMENTS

| | | |
|---|---|---|
| CN | 202205441 U | 4/2012 |
| CN | 102665325 A | 9/2012 |
| CN | 102810299 A | 12/2012 |
| CN | 102855849 A | 1/2013 |
| CN | 102881262 A | 1/2013 |
| JP | 2009-58857 A | 3/2009 |

\* cited by examiner

BACKLIGHT DRIVING CIRCUIT, LCD DEVICE, AND METHOD FOR DRIVING BACKLIGHT DRIVING CIRCUIT

TECHNICAL FIELD

The present disclosure relates to the field of liquid crystal displays (LCDs), and more particularly to a backlight driving circuit, an LCD device, and a method for driving the backlight driving circuit.

BACKGROUND

A constant current driver chip of a backlight driving circuit includes generally an over current protection (OCP) port and sets a corresponding threshold value of the OCP. If an output power of the backlight driving circuit is too high, circuit components may be damaged. The constant current driver chip may protect the backlight driving circuit by controlling the backlight driving circuit to turn off. A specific circuit diagram is shown in FIG. 1.

A typical constant current driver chip of the backlight driving circuit has only one threshold value of the OCP, and threshold value of the OCP is generally set according to a two-dimensional (2D) display mode. In a three-dimensional (3D) display mode, when the OCP is not triggered (namely the OCP threshold value is not reached) the output power of the backlight driving circuit is too high, which may damage the circuit components, and reduce working life of the backlight driving circuit.

SUMMARY

The aim of the present disclosure is to provide a backlight driving circuit, a light crystal display (LCD) device, and a method for driving the backlight driving circuit capable of providing an over current operation (OCP) to a backlight driving circuit having a two-dimension (2D) display mode and a three-dimension (3D) display mode.

The aim of the present disclosure is achieved through the following methods:

A backlight driving circuit comprises a power module and a constant current driver chip. The power module comprises a first controllable switch. An adjustable load is connected between the first controllable switch and a ground terminal of the backlight driving circuit, and the adjustable load comprises a switching module controlling a resistance value of the adjustable load, a switching mode signal of the backlight driving circuit is sent to a control end of the switching module. A first end of the adjustable load that is connected to the first controllable switch is coupled to an over current protection (OCP) port of the constant current driver chip.

Furthermore, the adjustable load comprises a first resistor and a second resistor connected to the first resistor in parallel, the switching module comprises a second controllable switch connected in series between the second resistor and the ground terminal of the backlight driving circuit, and the switching mode signal is sent to a control end of the second controllable switch. This is an adjustable load having connected-in-parallel resistors, when a current flows through the resistors, a voltage difference is formed at two end of the resistors then the voltage difference is fed back to the constant current driver chip, and the constant current driver chip determines if an threshold value of the OCP is reached according to the voltage difference. In the present disclosure, the second controllable switch controls the second resistor to turn on or turn off, which adjusts a resistance value of an entire adjustable load. When the voltage is constant, the second controllable switch turns off in the 2D display mode, only the first resistor is connected in the backlight driving circuit, the resistance value of the resistor is high, thus a preset voltage is obtained with a low current. When the voltage is constant, the second controllable switch turns on in the 3D display mode, the first resistor and the second resistor is connected in parallel in the backlight driving circuit, a resistance value of the connected-in-parallel first resistor and second resistor is lower than the resistance value of the first resistor, thus the preset voltage is obtained with a high current. When a protection point in the 2D display mode is more than a protection point in the 3D display mode, the present disclosure may perform an OCP function in different display modes. In addition, material costs of the resistor and the controllable switch are low, which reduces costs.

Furthermore, the constant current driver chip comprises an analog dimming pin ADIM outputting the switching mode signal to the control end of the switching module. According to a characteristic of the constant current driver chip, an output voltage of the backlight driving circuit in the 3D display mode is more than an output voltage of the backlight driving circuit in the 2D display mode, thus a signal outputted by the ADIM may be used as the switching mode signal, which simplifies circuit control, reduces development cycle, and decreases development and production costs.

Furthermore, the constant current driver chip comprises a comparator and a protection unit, where the first end of the adjustable load that is connected to the first controllable, switch is coupled to a non-inverting input end of the comparator, and a reference signal having a constant voltage is sent to an inverting input end of the comparator. An output end of the comparator is coupled to the protection unit, and the protection unit outputs a control signal to the first controllable switch. This is a specific circuit structure of the constant current driver chip.

Furthermore, the power module comprises an inductor and a diode, where a first end of the inductor is coupled to an external power, and a second end of the inductor is coupled to an anode of the diode; a cathode of the diode is coupled to a lightbar of the backlight driving, circuit, and the first controllable switch is coupled to the anode of the diode. This is a specific circuit structure of the power module.

Furthermore, the lightbar is a light emitting diode (LED) lightbar, a third controllable switch is connected in series between an output end of the LED lightbar and the ground terminal of the backlight driving circuit, and a pulse-width modulation (PWM) dimming signal is sent to a control end of the third controllable switch. This is an LED backlight driving circuit having as dimming function.

Furthermore, the adjustable load comprises a first resistor and a second resistor connected to the first resistor in parallel, the switching module comprises a second controllable switch connected in series between the second resistor and the ground terminal of the backlight driving circuit. The constant current driver chip comprises an analog dimming pin outputting the switching mode signal to a control end of the second controllable switch. The constant current driver chip comprises as comparator and a protection unit, where the first end of the adjustable load that is connected to the first controllable switch is coupled to a non-inverting input end of the comparator, and a reference signal having a constant voltage is sent to an inverting input end of the comparator. An output end of the comparator is coupled to the protection unit, and the protection unit outputs a control signal to the first controllable switch, and the power module comprises an inductor and a diode, a first end of the inductor is coupled to an external power, and a second end of the inductor is coupled to an anode of the diode. A cathode of the diode is coupled to an LED lightbar of the backlight driving circuit, and the first controllable switch is coupled to the anode of the diode. A third controllable switch is connected in series between an output end of the LED lightbar and the ground terminal of the backlight driving circuit, and a PWM dimming signal is sent to a control end of the third controllable switch. This is a specific backlight driving circuit.

A method for driving a backlight driving circuit comprises steps:

A: determining a display mode of the backlight driving circuit, and performing a step B in a two-dimensional (2D) display mode, performing, a step C in a three-dimensional (3D) display mode;

B: controlling a resistance value of a switching module corresponding to the 2D display mode by a switching, mode signal when the switching module uses a threshold value of an over current protection (OCP) in the 2D display mode; and C: controlling a resistance value of a switching module corresponding to the 3D display mode by a switching mode signal when the switching module uses the threshold value of the OCP in the 3D display mode.

Furthermore, the adjustable load comprises a first resistor and a second resistor connected to the first resistor in parallel, the switching module comprises a second controllable switch connected in series between the second resistor and the ground terminal of the backlight driving circuit. The step B comprises: outputting a low level signal to control the second controllable switch to turn off by the switching mode signal, and the step C comprises: outputting a high level signal to control the second controllable switch to turn on by the switching mode signal. This is an adjustable load having connected-in-parallel resistors, when a current flows through the resistors, a voltage difference is formed at two end of the resistors, then the voltage difference is fed back to the constant current driver chip, and the constant current driver chip determines if the threshold value of the OCP is reached according to the voltage difference. In the present disclosure, the second controllable switch controls the second resistor to turn on or turn of which adjusts the resistance value of an entire adjustable load. When the voltage is constant, the second controllable switch turns off in the 2D display mode, only the first resistor is connected in the backlight driving circuit, the resistance value of the resistor is high, thus a preset voltage is obtained with a low current. When the voltage is constant, the second controllable switch turns on in the 3D display mode, the first resistor and the second resistor is connected in parallel in the backlight driving circuit, a resistance value of the connected-in-parallel first resistor and second resistor is lower than the resistance value of the first resistor, thus the preset voltage is obtained with a high current. When a protection point in the 2D display mode is more than a protection point in the 3D display mode, the present disclosure may perform the OCP function in different display modes. In addition, material costs of the resistor and the controllable switch is low, which reduces costs.

A liquid crystal display (LCD) device comprises a backlight driving circuit of the present disclosure.

For a backlight driving circuit having a two-dimensional (2D) and three-dimensional (3D) display function, in the 3D display mode, if abnormal conditions make an output power of the backlight driving circuit too high, but the OCP is still not triggered, then the output power of the backlight driving circuit cannot be limited, which may damage components of the backlight driver circuit, and reduce a working life of the backlight driving circuit. Because protection currents are different between in the 2D display mode and in the 3D display mode, the present disclosure uses the adjustable load. And a resistance value of the adjustable load may be adjusted by the switching module, thus current values of the protection currents corresponding to the 2D display mode and 3D display mode are obtained. The present disclosure may have the OCP having two or more threshold values, thus the OCP may be obtained in the 2D display mode and 3D display mode. The present disclosure uses a typical OCP port of the constant current driver chip, thus the OCP may be obtained in 2D display mode and 3D display mode without changing internal structure of the constant current driving chip, thereby the backlight driving circuit is protected through a simple and practical circuit structure.

DETAILED DESCRIPTION

Figure 1:
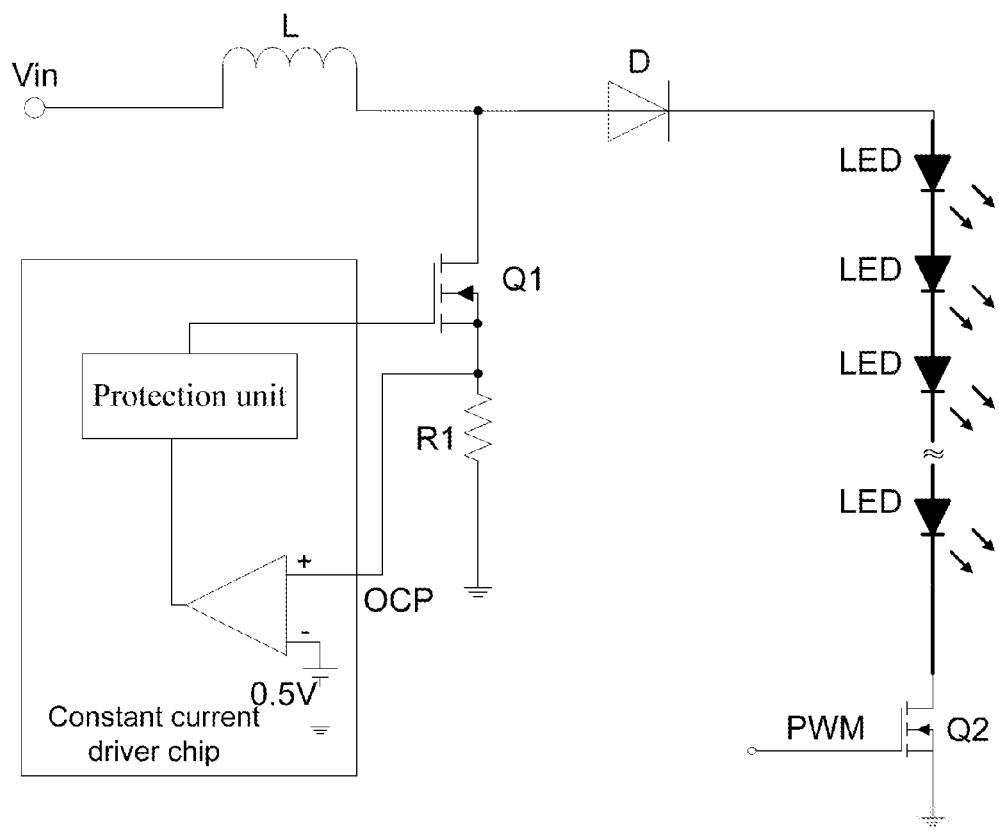
FIG. 1 is a schematic diagram of a typical backlight driving circuit.
Figure 2:
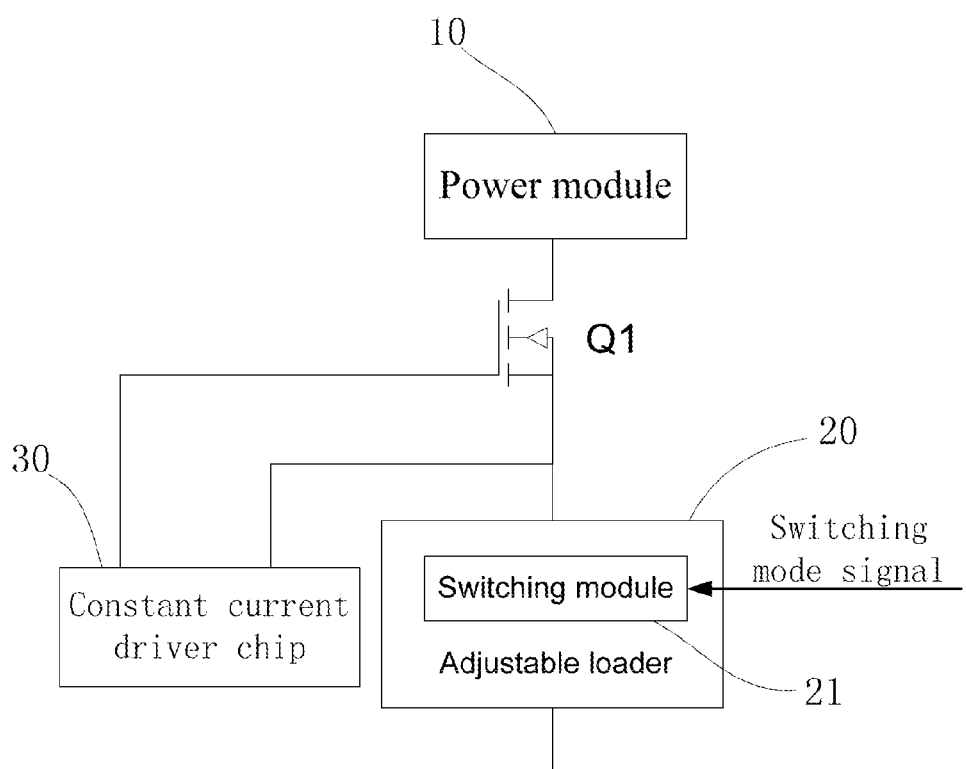
FIG. 2 is a block diagram of a backlight driving circuit of the present disclosure.

As shown in FIG. 2, the present disclosure provides a liquid crystal display (LCD) device comprising a backlight driving circuit. The backlight driving circuit comprises a power module 10 and a constant current driver chip 30. The power module 10 comprises a first controllable switch Q1. An adjustable load 20 is connected between the first controllable switch Q1 and a ground terminal of the backlight driving circuit. The adjustable load 20 comprises a switching module 21 controlling a resistance value of the adjustable load 20. A switching mode signal of the backlight driving circuit is sent to a control end of the switching modulo 21. A first end of the adjustable load 20 that is connected to the first controllable switch Q1 is coupled to an over current protection (OCP) port of the constant current driver chip 30.

For a backlight driving, circuit having a two-dimensional (2D) and three-dimensional (3D) display function, in the 3D display mode, if abnormal conditions make an output power of the backlight driving circuit too high, but the OCP is still not triggered, then the output power of the backlight driving circuit cannot be limited, which may damage components of the backlight driver circuit, and reduce working life of the backlight driving circuit. Because protection currents are different between in the 2D display mode and in the 3D display mode, the present disclosure uses the adjustable load. And a resistance value of the adjustable load may be adjusted by the switching module, thus current values of the protection currents corresponding to the 2D display mode and 3D display mode are obtained. The present disclosure may have the OCP have two or more threshold values, thus the OCP may be obtained in the 2D display mode and 3D display mode. The present disclosure uses a typical OCP port of the constant current driver chip, thus the OCP may be obtained in 2D display mode and 3D display mode without changing internal structure of the constant current driving chip, thereby the backlight driving circuit is protected through a simple and practical circuit structure.

The present disclosure will further be described in detail in accordance with the figures and the exemplary examples.

EXAMPLE 1

Figure 3:
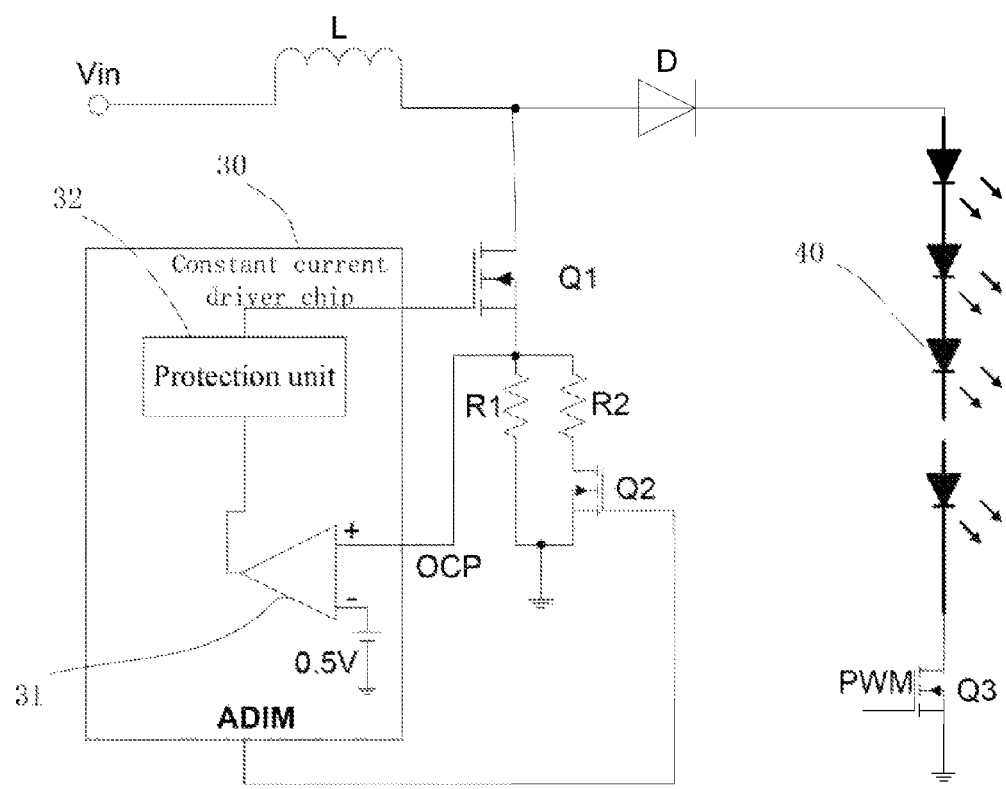
FIG. 3 is a schematic diagram of a constant current driver chip controlling a switching module in a backlight driving circuit of a first example of the present disclosure.
Figure 4:
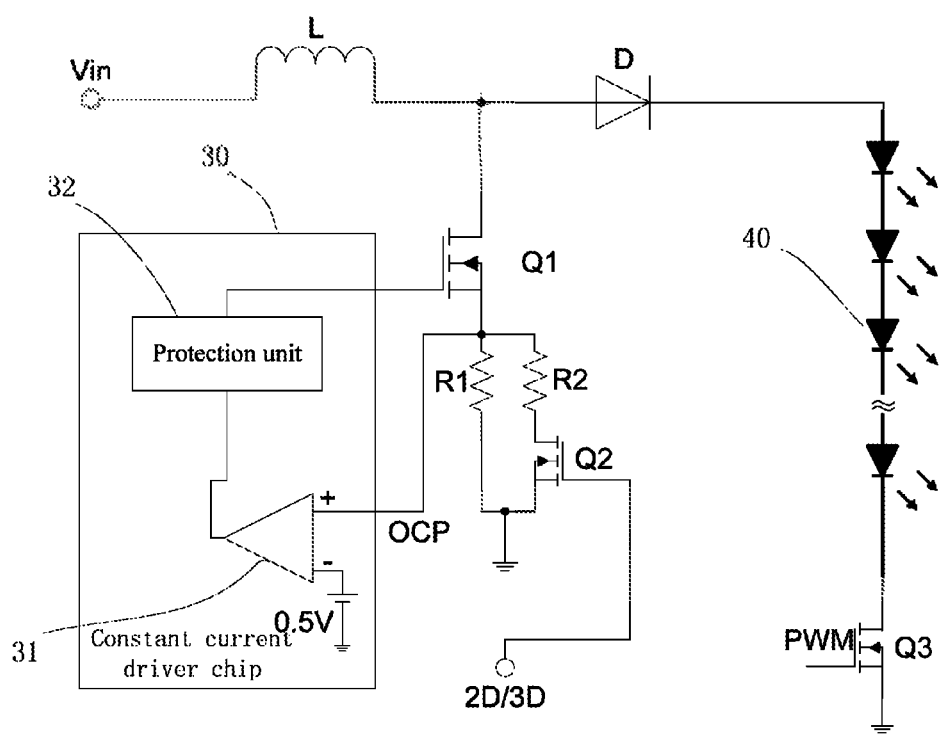
FIG. 4 is a schematic diagram of other circuit controlling a switching module in a backlight driving circuit of a first example of the present disclosure.

As shown in FIG. 3 and FIG. 4, a first example provides a backlight driving circuit comprising a power module and a constant current driver chip 30. The power module comprises a first controllable switch Q1. An adjustable load is connected between the first controllable switch Q1 and a ground terminal of the backlight driving circuit. The adjustable load comprises a switching module controlling a resistance value of the adjustable load, where a switching mode signal of die backlight driving circuit is sent to a control end of the switching module. A first end of the adjustable load that is connected to the first controllable switch Q1 is coupled to an OCP port of the constant current driver chip 30.

The adjustable load comprises a first resistor R1 and a second resistor R2 connected to the first resistor R1 in parallel. The switching module comprises a second controllable switch Q2, and the second controllable switch Q2 is connected between the second resistor R2 and the ground terminal of the backlight driving circuit in series. The constant current driver chip 30 comprises an analog dimming pin ADIM, where the ADIM outputs the switching node signal to control the second controllable switch Q2 to turn on or turn off. An output voltage of the backlight driving circuit in the 3D display mode is more than an output voltage of the backlight driving circuit in the 2D display mode according to characteristics of the constant current driver chip 30, thus a signal outputted by the ADIM may be used as the switching mode signal, which simplifies circuit control, reduces development cycle, and decreases development and production costs. The present disclosure may also provide the switching mode signal by other circuits, as shown in FIG. 4.

The constant current driver chip 30 comprises a comparator 31 and a protection unit 32, where the first end of the adjustable load that is connected to the first controllable switch Q1 is coupled to a non-inverting input end of the comparator 31, a reference signal having a constant voltage (0.5 V. 0.75 V, and the like) is sent to an inverting input end of the comparator 31. An output end of the comparator 31 is coupled to the protection unit 32, and the protection unit 32 outputs to control signal to the first controllable switch Q1. The power module comprises an inductor L and a diode D, where a first end of the inductor L is coupled to an external power, a second end of the inductor 1, is coupled to an anode of the diode D, and a cathode of the diode D is coupled to a light emitting diode (LED) lightbar 40, and the first controllable switch Q1 is coupled to the anode of the diode D.

To add a dimming function, a third controllable switch Q3 may be connected between an output end of the LED lightbar 40 and the ground terminal of the backlight driving circuit in series, and a pulse-width modulation (PWM) dimming signal is sent to to control end of the third controllable switch Q3.

The adjustable load having connected-in-parallel resistors is used in the example, when current flows through the resistors, a voltage difference is formed at two end of the resistors, then the voltage difference is fed back to the constant current driver chip 30, and the constant current driver chip 30 determines if the threshold value of the OCP is reached according to the voltage difference. In the present disclosure, the second controllable switch Q2 controls the second resistor R2 to turn on or turn off, which adjusts a resistance value of an entire adjustable load. When the voltage is constant, the second controllable switch Q2 turns of in the 2D display mode, only the first resistor R1 is connected in the backlight driving circuit, the resistance value of the resistor is high, thus a preset voltage is obtained with a low current. When the voltage is constant, the second controllable switch Q2 turns on in the 3D display mode, the first resistor R1 and the second resistor R2 is connected in parallel in the backlight driving circuit, a resistance value of the connected-in-parallel first resistor and second resistor is lower than the resistance value of the first resistor, thus the preset voltage is obtained with a high current. When a protection point in the 2D display mode is more than a protection point in the 3D display mode, the present disclosure may perform the OCP function in different display modes. In addition, material costs of the resistor and the controllable switch are low, which reduces costs.

The following analysis is obtained according to the FIG. 3:

An OCP pin of the constant current driver chip is connected to a source electrode of the first controllable switch Q1, and when an input current of the backlight driving circuit flows through the first resistor R1 and the second resistor R2, the voltage difference is formed at two end of the first resistor R1 and the second resistor R2, and the constant current driver chip detects the voltage difference.

In the 2D display mode, the voltage of the ADIM is low, the second controllable switch Q2 turns off, and the OCP pin detects that only the first resistor R1 is connected in the backlight driving circuit, a protection current of the OCP is:

$$I=0.5V/R1$$

In the 3D display mode, a signal of the 2D/3D is high level (logic 1), namely the voltage of the ADIM is high, the second controllable switch Q2 turns on, and the OCP pin detects that the first resistor R1 and the second resistor R2 are connected in parallel in the backlight driving circuit, the protection current of the OCP is:

$$I=0.5V/(R1/R2)$$

From the above formula, a threshold value of the OCP in the 2D display mode is more than a threshold value of the OCP in the 3D display mode, thus the present disclosure may perform the OCP function in different display modes.

EXAMPLE 2

Figure 5:
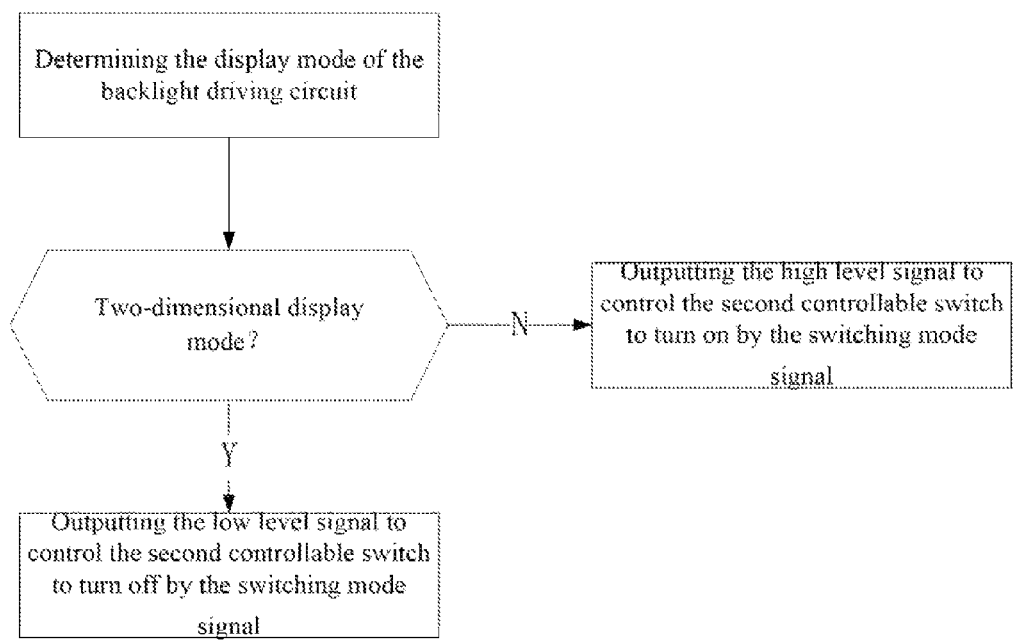
FIG. 5 is a schematic diagram of a method for driving a backlight driving circuit of a second example of the present disclosure.

As shown in FIG. 5, a second example provides a method for driving a backlight driving circuit of the present disclosure, comprising:

A: determining a display mode of the backlight driving circuit, and performing a step B in a two-dimensional (2D) display mode, performing a step C in a three-dimensional (3D) display mode.

B: controlling a resistance value of a switching module corresponding to the 2D display mode by a switching mode signal when the switching module uses a threshold value of an over current protection (OCP) in the 2D display mode.

C: controlling a resistance value of a switching module corresponding to the 3D display mode by a switching mode signal when the switching module uses the threshold value of the OCP in the 3D display mode.

The present disclosure provides an adjustable load comprising connected-in-parallel resistors. Specifically, the adjustable load comprises a first resistor and a second resistor connected to the first resistor in parallel, the switching module comprises a second controllable switch. The second controllable switch is connected between the second resistor and a ground terminal, of the backlight driving circuit in series.

The step B comprises: outputting a low level signal (logic 0) to control the second controllable switch to turn of by the switching, mode signal, and the step C comprises: outputting a high level signal (logic 1) to control the second controllable switch to turn on by the switching mode signal.

According to Ohm's law, when current flows through a resistor, a voltage difference is formed by at two ends of the resistor, and when a resistance value of the resistor is constant, the current and the voltage are directly proportional, as long as the voltage different is fed hack to the constant current driver chip, the constant current driver chip may determine if a threshold value of the OCP is reached according to the voltage difference.

In the example, the second controllable switch controls the second resistor to turn on or turn off, which adjusts a resistance value of an entire adjustable load. When the voltage is constant, the second controllable switch turns off in the 2D display mode, only the first resistor is connected in the backlight driving circuit, the resistance value of the resistor is high, thus a preset voltage is obtained with a low current. When the voltage is constant, the second controllable switch turns on in the 3D display mode, the rust resistor and the second resistor is connected in parallel in the backlight driving circuit, a resistance value of the connected-in-parallel first resistor and second resistor is lower than the resistance value of the first resistor, thus the preset voltage is obtained with a high current. When a protection point in the 2D display mode is more than a protection point in the 3D display mode, the present disclosure may perform the OCP function under different display modes. In addition, material costs of the resistor and the controllable switch are low, which reduces costs.

The present disclosure is described in detail in accordance with the above contents with the specific exemplary examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A backlight driving circuit, comprising: a power module; and
   a constant current driver chip, wherein the constant current driver chip comprises an analog dimming pin outputting a switching mode signal to the control end of the switching module;
   wherein the power module comprises a first controllable switch; an adjustable load is connected between the first controllable switch and a ground terminal of the backlight driving circuit, and the adjustable load comprises a switching module controlling a resistance value of the adjustable load, the switching mode signal of the backlight driving circuit is sent to a control end of the switching module;
   wherein a first end of the adjustable load that is connected to the first controllable switch is coupled to an over current protection (OCP) port of the constant current driver chip.

2. The backlight driving circuit of claim 1, wherein the adjustable load comprises a first resistor and a second resistor connected to the first resistor in parallel, the switching module comprises a second controllable switch connected in series between the second resistor and the ground terminal of the backlight driving circuit, and the switching mode signal is sent to a control end of the second controllable switch.

3. The backlight driving circuit of claim 1, wherein the constant current driver chip comprises a comparator and a protection unit, the first end of the adjustable load that is connected to the first controllable switch is coupled to a non-inverting input end of the comparator, and a reference signal having a constant voltage is sent to an inverting input end of the comparator; an output end of the comparator is coupled to the protection unit, and the protection unit outputs a control signal to the first controllable switch.

4. The backlight driving circuit of claim 1, wherein the power module comprises an inductor and a diode, a first end of the inductor is coupled to an external power, and a second end of the inductor is coupled to an anode of the diode; a cathode of the diode is coupled to a lightbar of the backlight driving circuit, and the first controllable switch is coupled to the anode of the diode.

5. The backlight driving circuit of claim 4, wherein the lightbar is a light emitting diode (LED) lightbar, a third controllable switch is connected in series between an output end of the LED lightbar and the ground terminal of the backlight driving circuit, and a pulse-width modulation (PWM) dimming signal is sent to a control end of the third controllable switch.

6. A method for driving a backlight driving circuit, the backlight driving circuit comprising a power module and a constant current driver chip, the power module comprising a first controllable switch; an adjustable load being connected between the first controllable switch and a ground terminal of the backlight driving circuit, and the adjustable load comprising a switching module controlling a resistance value of the adjustable load, a switching mode signal of the backlight driving circuit sent to a control end of the switching module; a first end of the adjustable load that is connected to the first controllable switch and coupled to an OCP port of the constant current driver chip; the method comprising:
   A: determining a display mode of the backlight driving circuit, performing a step B in a two-dimensional (2D) display mode, and performing a step C in a three-dimensional (3D) display mode;
   B: controlling a resistance value of a switching module corresponding to the 2D display mode by a switching mode signal when the switching module uses a threshold value of an over current protection (OCP) in the 2D display mode; and
   C: controlling a resistance value of a switching module corresponding to the 3D display mode by a switching mode signal when the switching module uses the threshold value of the OCP in the 3D display mode.

7. The method for driving a backlight driving circuit of claim 6, wherein the adjustable load comprises a first resistor and a second resistor connected to the first resistor in parallel, the switching module comprises a second controllable switch connected in series between the second resistor and a ground terminal of the backlight driving circuit; the step B comprises: outputting a low level signal to control the second controllable switch to turn off by the switching mode signal; the step C comprises: outputting a high level signal to control the second controllable switch to turn on by the switching mode signal.

8. A liquid crystal display (LCD) device, comprising:
   a backlight driving circuit comprising a power module and a constant current driver chip, wherein the constant current driver chip comprises an analog dimming pin outputting a switching mode signal to the control end of the switching module;
   wherein the power module comprises a first controllable switch, an adjustable load is connected between the first controllable switch and a ground terminal of the backlight driving circuit, and the adjustable load comprises a switching module controlling a resistance value of the adjustable load, the switching mode signal of the backlight driving circuit is sent to a control end of the switching module;

wherein a first end of the adjustable load that is connected to the first controllable switch is coupled to an over current protection (OCP) port of the constant current driver chip.

9. The LCD device of claim 8, wherein the adjustable load comprises a first resistor and a second resistor connected to the first resistor in parallel, the switching module comprises a second controllable switch connected in series between the second resistor and the ground terminal of the backlight driving circuit, and the switching mode signal is sent to a control end of the second controllable switch.

10. The LCD device of claim 8, wherein the constant current driver chip comprises a comparator and a protection unit, the first end of the adjustable load that is connected to the first controllable switch is coupled to a non-inverting input end of the comparator, and a reference signal having a constant voltage is sent to an inverting input end of the comparator; an output end of the comparator is coupled to the protection unit, and the protection unit outputs a control signal to the first controllable switch.

11. The LCD device of claim 8, wherein the power module comprises an inductor and a diode, a first end of the inductor is coupled to an external power, and a second end of the inductor is coupled to an anode of the diode; a cathode of the diode is coupled to a lightbar of the LCD device, and the first controllable switch is coupled to the anode of the diode.

12. The backlight driving circuit of claim 11, wherein the lightbar is a light emitting diode (LED) lightbar, a third controllable switch is connected in series between an output end of the LED lightbar and the ground terminal of the backlight driving circuit, and a pulse-width modulation (PWM) dimming signal is sent to a control end of the third controllable switch.

* * * * *